3,221,438
RODENT REPELLING DEVICE
Phillip H. Huyssen, 61 S. 6th Ave., La Grange, Ill.
Filed July 12, 1963, Ser. No. 294,682
3 Claims. (Cl. 43—124)

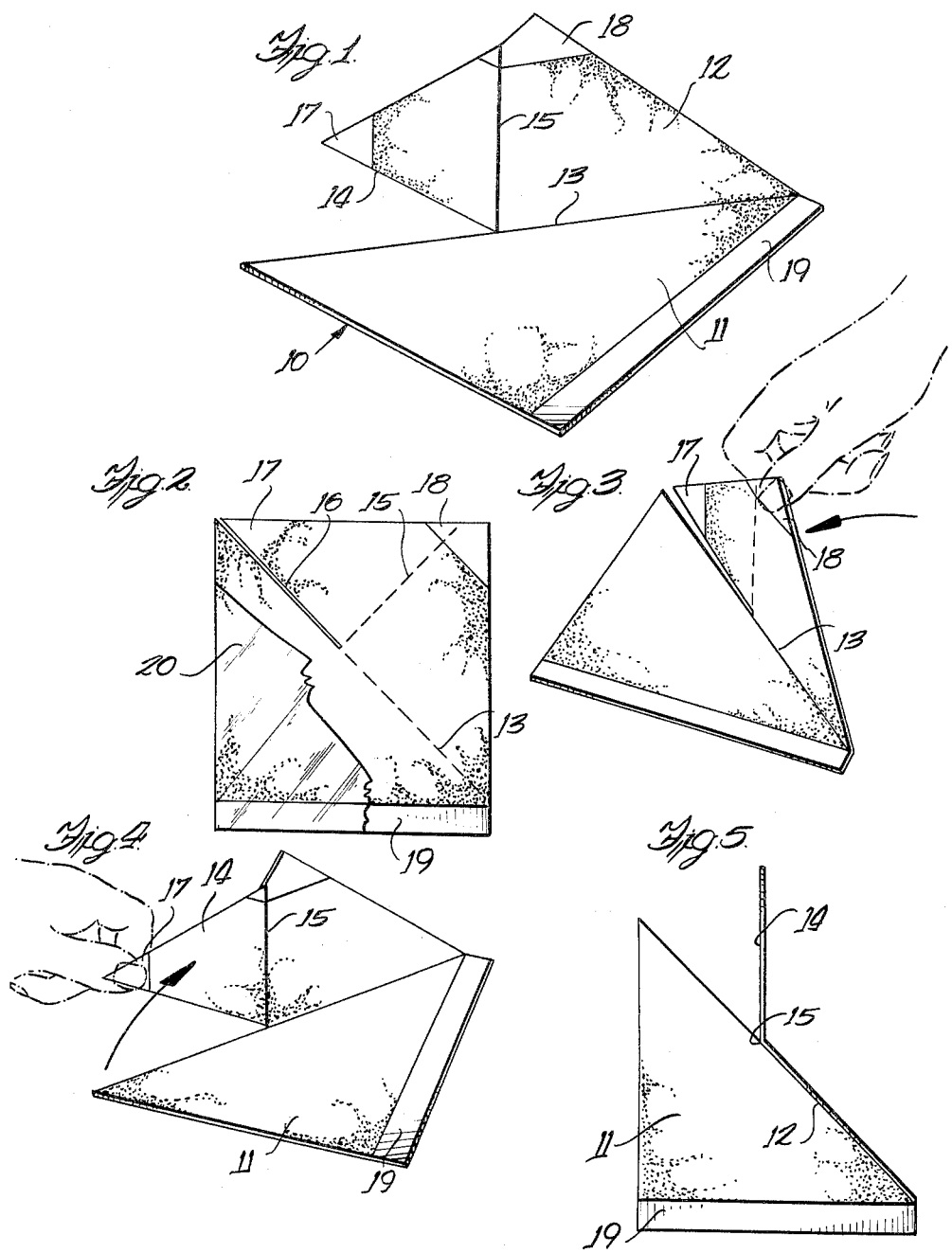

This invention relates to a device for ridding dwellings and other areas of rats, mice and other similar vermin.

Poisons and traps frequently prove ineffective in routing and ridding factories, farms and dwellings of rodents and other vermin, largely because of the intelligence of such animals. For example, rats soon learn to avoid traps or to resist eating poison foods or foods placed within traps after several of their numbers have been caught or killed. The result is that such devices lose much of their value as soon as their presence and effect has been recognized by the animals.

Accordingly, it is an object of the present invention to provide an extremely inexpensive but highly effective device for routing vermine from such areas, the device operating on a different principle than prior devices intended for the same purpose. Specifically, it is an object to provide a device which depends for its effectiveness on the intelligence of the rodents and their ability to learn to avoid areas which cause them physical discomfort.

Other objects will appear from the specification and drawings in which:

FIGURE 1 is a perspective view of a device embodying the present invention;

FIGURE 2 is a top plan view in reduced scale of the device before it is folded and its protective cover is removed;

FIGURE 3 is a perspective view illustrating the folding of the device after its cover is removed;

FIGURE 4 is a perspective view illustrating a second step in the folding of the device;

FIGURE 5 is a top plan view of the device when the same is ready for use.

An important aspect of the present invention lies in the discovery that a more effective approach in eliminating rodents and other vermin from factories, dwellings and the like lies in making use of their intelligence rather than in trying to trick such animals into entering traps or eating poisoned foods. Specifically, the device of the present invention relies for its effectiveness on the behavior patterns of such rodents, their ability to learn, and their natural dislike for places and things which they associate with physical discomfort.

Referring to the drawings, the numeral 10 generally designates a device embodying the present invention. Such a device comprises a small generally rectangular sheet of paper or other foldable material, the sheet when folded having a base portion 11 and an upstanding portion 12 meeting along a generally diagonal fold line 13.

One side of the sheet is coated with an extremely tacky pressure sensitive adhesive. Any suitable and conventional adhesive having such characteristics may be used; however, it is essential that the selected adhesive be capable of adhering upon contact to the fur of rats, mice and other rodents. A typical tacky pressure sensitive adhesive of the type referred to above may be prepared from guayule rubber which, in its natural crude state contains a substantial proportion (20 to 25 percent) of natural resins which act as plasticizers. For this use it should not be deresinated so that in low-sulfur compounds it will remain permanently tacky.

When the device has been folded along line 13 so that portion 12 extends upwardly in a generally vertical direction, the adhesive coating of base portion 11 faces upwardly. Thus, the device may be placed upon the floor or upon any other horizontal supporting surface and, since the underside of the base portion is not coated with adhesive, is capable of sliding about upon such a surface. Stabilization of the device is achieved by means of a laterally projecting flap 14 which constitutes part of upstanding portion 12 and which merges with the remainder of that portion along a vertical fold line 15. To permit the outward folding of flap 14, the sheet is provided with a slit 16 (FIGURE 2) which is in longitudinal alignment with the diagonally-extending fold line 13.

To facilitate folding of the device, portions 17, 18 and 19 of the sheet are preferably uncoated with the adhesive. A user may therefore grip the sheet by uncoated corner portion 18 to fold the sheet along line 13, as illustrated in FIGURE 3, and thereafter may grip flap 14 by uncoated portion 17 to fold the flap outwardly about fold line 15, as shown in FIGURE 4.

Referring to FIGURE 2, it will be observed that a protective covering sheet extends over the coated side of sheet 10 to permit handling and storage of the device prior to use. At the time of use, a user simply strips or peels away the protective cover, such peeling action being facilitated by the absence of adhesive along portions 17, 18 and 19 of the sheet. In other words, separation of sheet 10 and its cover 20 may be readily initiated along any of these uncoated portions.

The size of the device may be varied depending largely upon the size of the animal with which it is intended to be used. However, for use with rats and mice, it has been found that a sheet no larger than about four inches along each side edge is suitable, the preferred dimension being approximately two inches along each side edge giving a total coated area of approximately four square inches.

In use, a number of devices are prepared as shown in FIGURES 3, 4 and 1, and are scattered about on the floor of an area frequented by rodents. Rats and other rodents frequently travel in packs, especially in heavily infested areas. At night, when such animals search for food, and as they travel over the areas sprinkled with devices 10, they brush against the devices and, because of the extremely tacky nature of the adhesive, such devices cling to their fur. In trying to remove such devices, additional areas of fur contact the adhesive and, where there is a pack of rodents, more than one animal may contact the same device. In attempting to free themselves from the adhesive covered devices, the pulling action on their fur causes considerable discomfort to the animals. It has been found that the rodents grow increasingly irritable and even fight among themselves, especially where two animals contact the same device. Although the devices cause no real injury to the animals, the discomfort is severe enough that such animals quickly learn to avoid placing themselves in a position where the experience might be repeated. It has been found that a single experience with such devices produces a strong enough impression to discourage rats from returning to an area which they previously frequented and, thus, the rodent population of buildings infested with large numbers of rats or mice may be quickly reduced to zero.

While in the foregoing I have disclosed an embodiment of the invention in considerable detail for purposes of illustration, it will be understood by those skilled in the art that many of these details may be varied without departing from the spirit and scope of the invention.

I claim:

1. A rodent repelling device comprising a rectangular sheet of foldable material coated on one side thereof with a tacky pressure sensitive adhesive capable of adhering to the fur of a rodent, said sheet having a single straight diagonally-extending horizontal fold line dividing the same into a generally triangular base portion and a generally triangular upstanding portion when said sheet is folded therealong, said adhesive coating being disposed on the upper surface of said base portion and on one side of said upstanding portion when said sheet is folded and placed upon a supporting surface with its base resting thereon, said sheet having a slit extending diagonally and in longitudinal alignment with said fold line and terminating intermediate opposite corners of said sheet, said upstanding portion being provided with a vertical fold line intersecting said slit to define a flap portion foldable outwardly in a direction opposite to said base portion for stabilizing said device, said adhesive-coated surface of said base being at least as large as the area of said coated upstanding portion directly above said horizontal fold line.

2. The structure of claim 1 in which a protective cover extends over the adhesive-coated side of said sheet, said cover being removable to expose the tacky adhesive-coated surface of said sheet.

3. The structure of claim 2 in which said sheet has portions adjacent the edges thereof free of said adhesive coating to facilitate separation of said sheet and its removable cover.

References Cited by the Examiner
UNITED STATES PATENTS

| | | | |
|---|---|---|---|
| 767,053 | 8/1904 | Haner | 43—114 |
| 807,040 | 12/1905 | Mausert | 43—114 |
| 862,467 | 8/1907 | Gardiner | 43—114 |
| 884,095 | 4/1908 | Kroenberg et al. | 43—114 |
| 1,112,064 | 9/1914 | Gordon | 43—114 |
| 2,081,095 | 5/1937 | Mull. | |

FOREIGN PATENTS 856,313  3/1940  France.

ABRAHAM G. STONE, *Primary Examiner.*

F. RAY CHAPPELL, *Examiner.*